N. BADISCO.
AMUSEMENT DEVICE.
APPLICATION FILED JUNE 18, 1910.
985,880.
Patented Mar. 7, 1911.
2 SHEETS—SHEET 1.
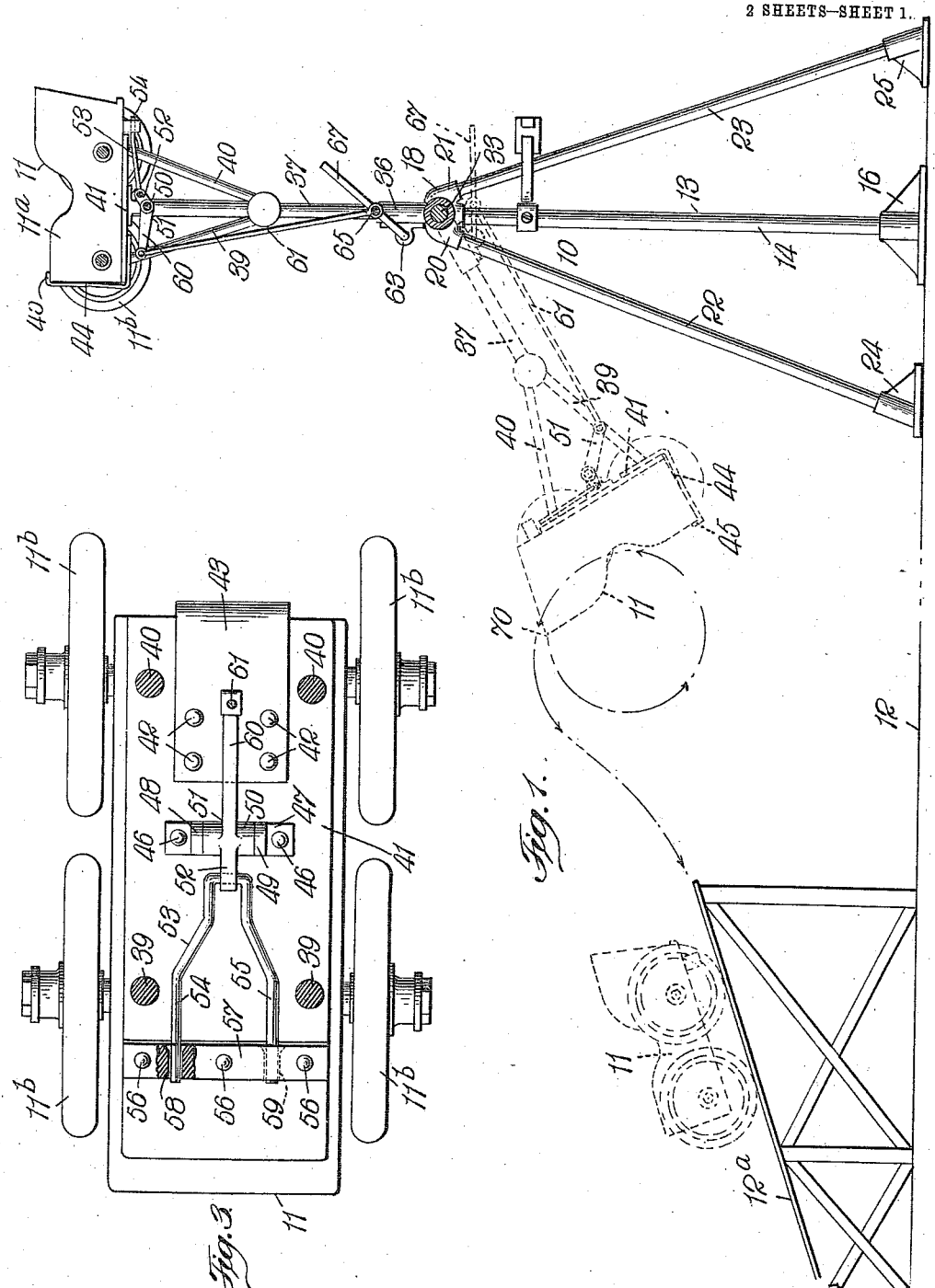

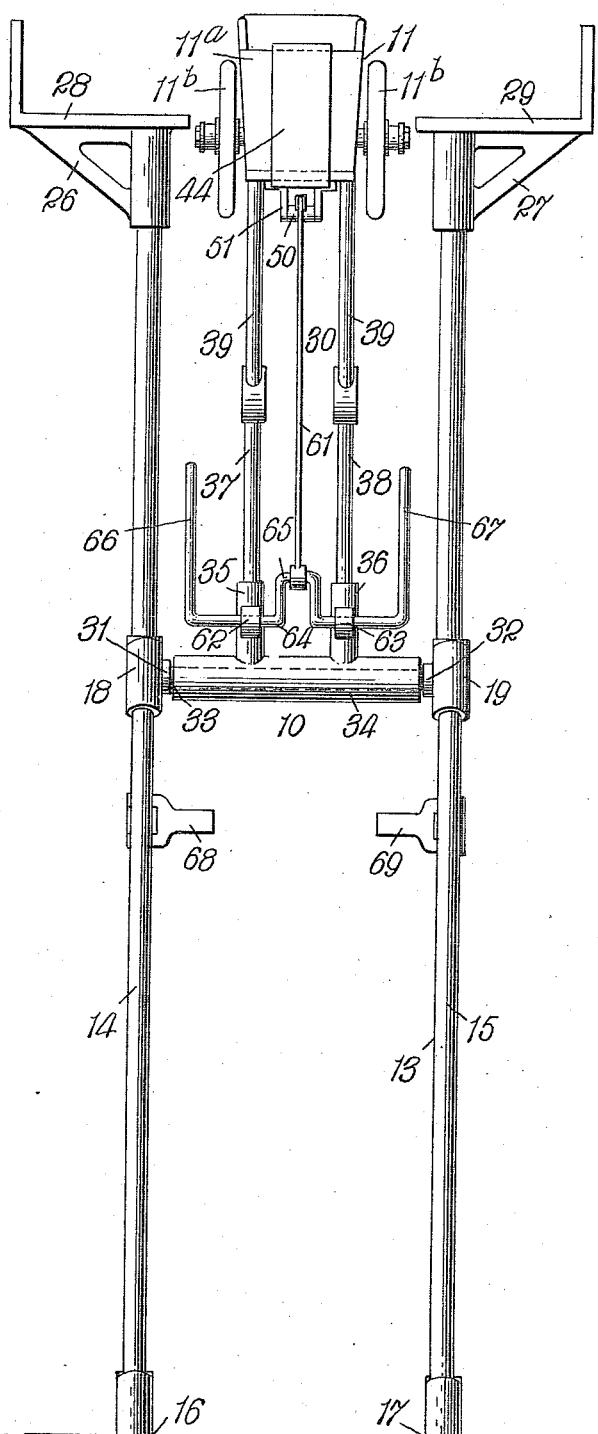

UNITED STATES PATENT OFFICE.

NICOLAS BADISCO, OF NEW YORK, N. Y.

AMUSEMENT DEVICE.

985,880.   Specification of Letters Patent.   Patented Mar. 7, 1911.

Application filed June 18, 1910. Serial No. 567,667.

*To all whom it may concern:*

Be it known that I, NICOLAS BADISCO, a subject of the King of Belgium, and a resident of New York, county and State of New York, have invented certain new and useful Improvements in Amusement Devices, of which the following is a full, clear, and exact specification.

This invention relates to a class of devices adapted to be used at pleasure resorts and places of amusement by which a thrilling and exciting ride in an automobile or like vehicle may be enjoyed by the public or which may be used by experts to perform an interesting feat at public exhibitions.

The primary object of my invention is to produce a form of device which may be so constructed as to occupy a limited area of space and wherein an automobile is employed in conjunction with mechanism to pass through an aerial descent and be swung so as to make a midair loop and subsequent safe landing upon a platform or surface of the ground.

Another object of the invention is to provide elevated platforms from which the automobile is entered by passengers, and to provide a form of swinging device by which the automobile is carried through the air to a predetermined point in its descent and then swung at an angle with sufficient momentum to make a midair loop.

A further object of the invention is to provide efficient means whereby the automobile may be safely connected to the swinging bracket, and to provide means adapted to effectually release the connecting means from the vehicle at the proper point of the swinging movement.

Furthermore, the invention consists of certain other novel features and parts as represented in the accompanying drawings, forming a part of this specification, in which similar characters of reference indicate corresponding parts in all the views, the said invention being more fully described hereinafter and then pointed out in the appended claims.

In the drawing, Figure 1 is a side elevation showing one form of my invention when erected. Fig. 2 is a front elevation thereof, and Fig. 3 is a plan view of the bottom of the vehicle.

Upon a flooring, as 12, or other suitable place may be erected my pleasure device 10 which may be of any preferred height to permit the vehicle 11 having a body 11ª and wheels 11ᵇ to be swung so as to make a midair revolution in the form of a loop and safely land for further travel upon an elevated platform, as at 12ª, or if desired said platform may be dispensed with and the device arranged so that the vehicle will land upon a flooring or surface of the ground.

The supporting frame 13 of the device consists mainly of two uprights or standards 14 and 15 which are vertically arranged in parallel relation and are suitably spaced apart. These standards 14 and 15 are preferably made of metal rods or tubes of sufficient strength to withstand the required strain, and are supported by shoes, as 16 and 17, which may be fastened in any desired manner to the flooring or the like. Substantially midway of the length of each of the standards 14 and 15 is rigidly held a sleeve, as 18 and 19, and formed upon said sleeves are elbows 20 and 21 each having a socket therein for reception of one end of braces 22 and 23 the opposite ends of which are held in shoes 24 and 25 which may be fastened to the flooring similarly to the shoes 16 and 17. Upon the upper ends of the vertical standards 14 and 15 are provided brackets 26 and 27 which support platforms 28 and 29 arranged so that passengers may conveniently step therefrom into the vehicle 11 for taking a ride.

As shown in Fig. 2 the starting point of the vehicle 11 before making a descent is at the top of the vertical standards 14 and 15 and is positioned between the passenger platforms 28 and 29 upon the swinging device 30 to which said vehicle is detachably held. On the opposed surfaces of the walls of each of the sleeves 18 and 19 are provided bosses 31 and 32 having recesses forming bearings in which is journaled the shaft 33 upon which is arranged a sleeve 34. The sleeve 34 may be revolubly held upon the shaft 33 in which case said shaft is rigidly held in the recesses of the bosses 31 and 32 or the sleeve 34 may be rigidly held to the shaft 33 which will then be arranged to rotate in the recesses of said bosses. Two parallel arranged short studs 35 and 36 extend at right angles from the sleeve 34, and to each of said studs is connected one end of parallel arranged bars, as 37 and 38. Each of the bars 37 and 38 terminate with forked ends which are substantially V-shaped so that the prongs 39 and 40 will be spaced apart at the free ends thereof and said ends are connected to a plate 41, Fig. 3, adapted to support the vehicle 11. Fastened by bolts 42 or otherwise to the supporting-plate 41 is a clutch-plate 43 having an angular part 44 disposed to rest against one of the end walls of the body of the vehicle 11, and the free end of said angular part is hook-shaped, as at 45, so as to engage and firmly hold the vehicle to the clutch-plate 43 and substantially centrally of the supporting-plate 41 is connected by bolts 46 a plate 47 having lugs 48 and 49 in which is pivotally held the short shaft 50 of a bell-crank lever 51.

As a means to lock the swinging device 30 to the forward part of the bottom of the vehicle 11 when said vehicle is carried thereupon and which is subsequently released from the supporting-plate 41 so that the vehicle may be properly tilted to make a mid-air loop, at the end of the arm 52 of the bell-crank lever 51 is pivotally held a locking member 53 having two projecting arms 54 and 55, and crosswise of the bottom of the body of the vehicle is fastened by bolts, as 56, a latch-plate 57 in which openings 58 and 59 are provided for reception of the free ends of the arms 54 and 55.

To the end of the arm 60 of the bell-crank lever 51 is pivotally held a rod 61 forming a part of the releasing means to disengage the locking member 53 from the latch-plate 57. Upon the outer wall of the short studs 35 and 36 are formed apertured lugs 62 and 63 in which is rotatably held an angular bar 64 provided centrally thereof with a crank-shaped part, as 65, which pivotally carries the rod 61. The angular bar 64 has two arms 66 and 67, and upon the standards 14 and 15 in proximity to the sleeves 18 and 19 are hinged stops 68 and 69 so that when the swinging means 30 is swung downwardly the stops 68 and 69 will be in the path of movement of the arms 66 and 67 for contacting therewith. The crank 65 will be given a reverse movement thereby and in turn will draw downwardly the rod 61 and arm 60 of the bell-crank lever 51 and by which the locking member 53 will be freed from the latch-plate 57 to disconnect the forward part of the vehicle 11 from the supporting plate 41.

As indicated in dotted lines, as at 70, Fig. 1, when the vehicle 11 reaches a predetermined point in mid-air the momentum received during its descent will force the vehicle forward, and the swinging device 30 which is also carried with it serves to give the vehicle sufficient added impetus to be tilted by the clutch-plate 44 and thrown through a revolution in the form of a loop and subsequent passage to a safe landing upon the platform 12.

It is understood that changes may be made in the form of the frame work supporting my amusement device, or in the vehicle, or in the arrangement and proportions of the various parts of the invention without departing from the spirit and scope thereof, therefore I do not wish to be limited to the particular form of device as herein illustrated and set forth.

Having thus described my invention, I claim as new and desire to secure by Letters Patent:

1. In an amusement device, the combination with a vehicle adapted to travel upon a flooring; of a supporting frame; platforms arranged upon said supporting frame; a swinging device carried by the supporting frame; a supporting-plate held upon the swinging device; means to lock the vehicle to the supporting-plate; and means to release the vehicle from said supporting-plate after the swinging device and the vehicle thereupon is swung in the air.

2. In an amusement device, the combination with a vehicle adapted to travel upon a flooring; of two parallel arranged vertical standards, one end of each of which is fastened to a flooring; brackets provided upon the upper ends of the vertical standards; a platform connected upon each of the brackets; a swinging device carried by the vertical standards and arranged to swing between said standards; means carried upon the end of the swinging device to support the vehicle in an elevated position; means to lock the vehicle to the supporting-plate; releasing means for unlocking the locking means to release the vehicle from the supporting-plate; and means provided upon the vertical standards to operate the releasing means when the swinging device and said vehicle are swung in the air.

3. In an amusement device, the combination with a vehicle adapted to travel upon the surface of the ground; of two parallel arranged vertical standards the lower end of each of which is held in a shoe fastened to the ground, a sleeve held substantially midway of the length upon the vertical standards; elbows formed upon each sleeve and having recesses therein; braces, one end of each of which is held in the recesses of said elbows; a shoe held upon the opposite end of each brace; a bracket provided upon the upper end of each of the vertical standards; a passenger platform connected upon each of the brackets; a boss formed upon each of the sleeves held upon the vertical standards and having a bearing therein; a shaft journaled in the bearings; a sleeve held upon the shaft; two studs arranged at right angles upon the sleeve; two parallel arms connected to the studs, and having forked ends; a supporting-plate held upon the prongs of the forked ends and provided with a clutch-plate formed with a bent end to grip the upper edge of one end of the body of the vehicle; a latch-plate carried upon the bottom of the body of the vehicle; a locking member provided upon the supporting-plate to engage the latch-plate; releasing means arranged upon the swinging device for unlocking the locking member to release the vehicle from the supporting-plate; and means provided upon the vertical standards to operate the releasing means whereby the vehicle may be swung to make a revolution in the air.

4. In an amusement device, the combination with a vehicle adapted to travel upon a platform; of a supporting frame erected upon a flooring; two passenger platforms arranged upon the upper ends of the supporting frame; a swinging device having a shaft journaled substantially midway of the middle of the frame; a supporting-plate carried upon the end of the swinging-device to support the vehicle in an elevated position; an angularly disposed clutch-plate formed upon one end of the supporting-plate and having a bent end to grip the upper edge of one end of the body of the vehicle; a plate extending crosswise of the bottom of the vehicle and fastened thereto; two openings provided in said plate; a plate connected to the supporting-plate substantially centrally thereof and having two apertured lugs; a bell-crank lever pivotally held in the lugs and having two arms; a locking member pivotally held to one arm of the bell-crank lever and having two arms the end of each of which is adapted to engage one of the openings in the plate upon the bottom of the vehicle; releasing means arranged upon the swinging device for unlocking the locking member to release the vehicle from the supporting-plate; and means provided upon the supporting frame to operate the releasing means whereby the vehicle may be swung to make a revolution in the air.

5. In an amusement device, the combination with a vehicle adapted to travel upon a platform of two parallel arranged vertical standards, one end of each of which is fastened to a flooring; two braces, each connected to the flooring and to each of the vertical standards; brackets provided upon the upper ends of the vertical standards; a platform connected upon each of the brackets; a shaft journaled in bearings provided substantially midway of the length of the vertical standards; a swinging device carried upon the shaft; a supporting-plate carried upon the end of the swinging-device; a clutch-plate connected upon the supporting-plate and having a hook-shaped end bent so as to grip the upper edge of one end of the body of the vehicle; a latch-plate having openings therethrough and connected crosswise upon the bottom of the body of the vehicle; a bell-crank lever arranged substantially centrally upon the supporting-plate and having two arms; a locking member pivotally held to one arm of the bell-crank lever and provided with two extending arms adapted to enter the openings in the latch-plate; a rod pivotally held to the second arm of the bell-crank lever; an angular bar pivotally held to said rod and to the lower part of the swinging device said angular bar having two projecting arms; and a stop hinged to each of the vertical standards so as to be in the path of the movement of said projecting arms when the swinging device and vehicles are swung in the air.

6. In an amusement device, the combination with a vehicle adapted to travel upon a platform; of two parallel, vertical standards the lower end of each of which is held in a shoe fastened to the platform; a sleeve held substantially midway of the length upon the vertical standards; elbows formed upon each sleeve and having a recess therein; a brace held in each recess of the elbows and connected to a shoe fastened to the platform; a bracket provided upon the upper end of each of the vertical standards; a passenger platform arranged upon each of the brackets; a boss formed upon each of the sleeves held upon the vertical standards and having a bearing therein; a shaft journaled in the bearings; a sleeve held upon the shaft; two extending studs arranged at right angles upon the sleeve; two parallel arms connected to the studs each having forked V-shaped prongs; a supporting-plate held upon the prongs; a clutch-plate having a hook-shaped end connected upon one end of the supporting-plate; a latch-plate having openings therethrough and connected crosswise upon the bottom of the body of the vehicle; a plate connected to the supporting-plate substantially centrally thereof and having two apertured lugs; a bell-crank lever pivotally held in the lugs, and having two arms; a locking member pivotally held to one arm of the bell-crank lever and having two arms the ends of which are adapted to engage the openings in the latch-plate; apertured lugs provided upon said extending studs; an angular bar pivotally held in the extending studs, and having two projecting arms; a rod pivotally held at one end to the second arm of the bell-crank lever and having the opposite end thereof rotatably held upon the angular bar; and a stop hinged to each of the vertical standards so as to be in the path of the movement of said projecting arms when the swinging device and vehicle are swung in the air.

7. In an amusement device, the combination with a supporting frame comprising a plurality of vertically arranged standards and two oppositely arranged passenger platforms provided upon the top of the supporting frame; of a swinging device held upon a shaft journaled substantially midway of the supporting frame, said swinging device consisting of two parallel extending studs provided upon the shaft and each having an apertured lug formed thereupon; two parallel arms having forked V-shaped prongs; a plate held upon the prongs to support a vehicle in an elevated position between the passenger platforms; means to lock the plate to the bottom of a vehicle; and means held upon the swinging device and operated by the swinging movement of said device to release the locking means from the vehicle when swung in midair.

8. In an amusement device, the combination with a supporting frame comprising a plurality of vertically arranged standards erected upon a platform; a plurality of braces arranged to strengthen the standards; and two oppositely arranged passenger platforms provided upon the top of the vertical standards; a swinging device held upon a shaft journaled substantially midway of the supporting frame; a plate arranged upon the swinging device to support a vehicle in an elevated position between the passenger platforms; locking means to lock the plate upon the swinging device to the vehicle, said locking means consisting of a latch-plate having two openings therethrough and connected crosswise to the bottom of the vehicle; an angular clutch-plate fastened to the supporting-plate and having a hook-shaped end to grip the upper edge of one end of the body of the vehicle; a plate having apertured lugs fastened substantially centrally of the supporting plate; a short shaft journaled in the apertured lugs; a bell-crank lever provided upon the short stud; releasing means arranged upon the swinging device and connected to the bell-crank lever; and stops arranged upon the supporting frame to operate the releasing means to unlock said locking means when the swinging device and vehicle thereupon are swung to a predetermined point in midair.

This specification signed and witnessed this sixteenth day of June A. D. 1910.

NICOLAS BADISCO.

Witnesses:
ROBT. B. ABBOTT,
C. GASSERT.

---

Copies of this patent may be obtained for five cents each, by addressing the "Commissioner of Patents, Washington, D. C."